Sept. 16, 1924.　　　　　　　　　　　　　　　　1,508,494
G. ALLISON
MACHINE FOR REMOVING THE BOOSTER CHARGE FROM A HIGH EXPLOSIVE SHELL
Filed Oct. 5, 1923　　　　3 Sheets-Sheet 1
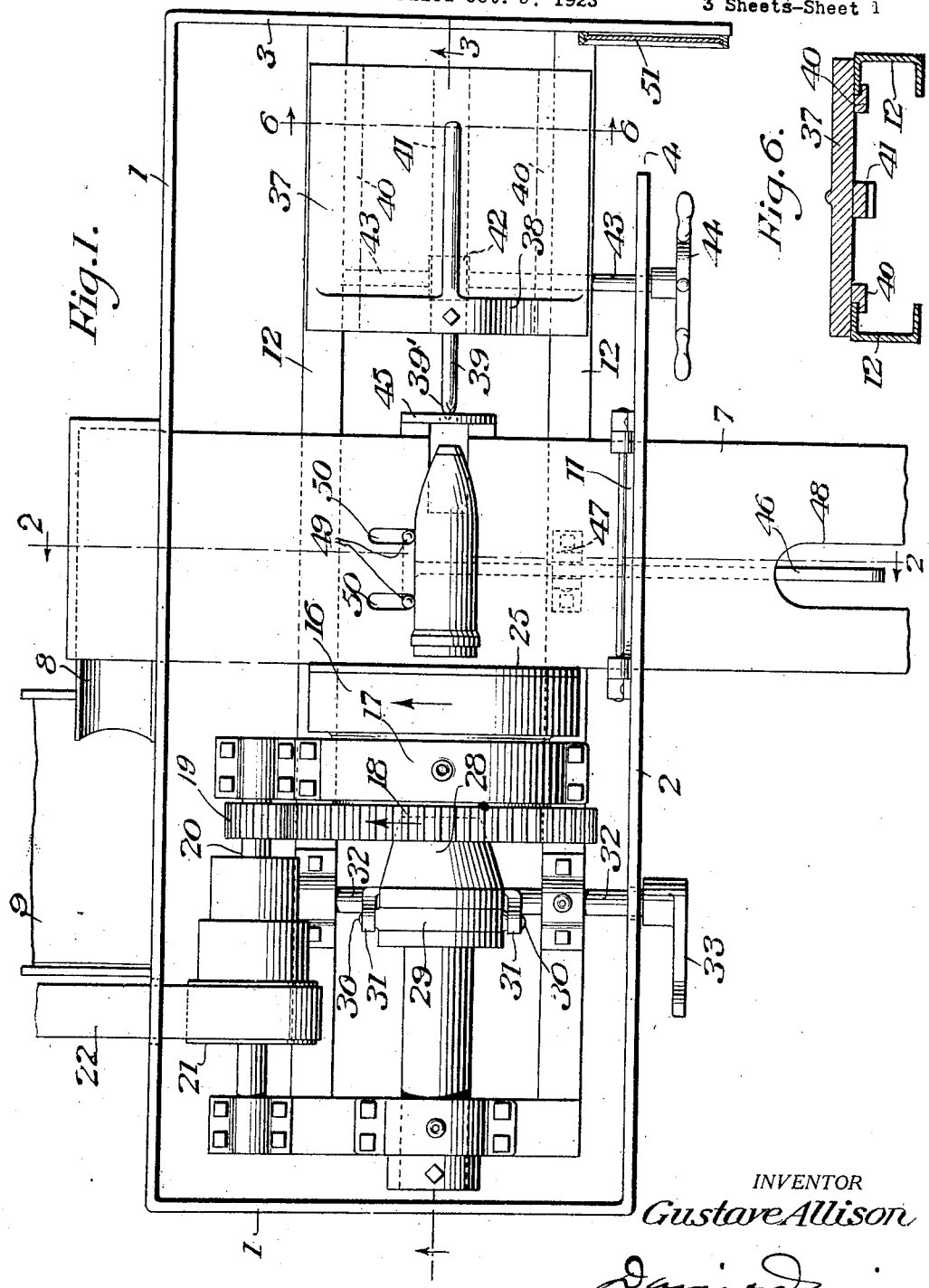
INVENTOR
Gustave Allison
ATTORNEYS

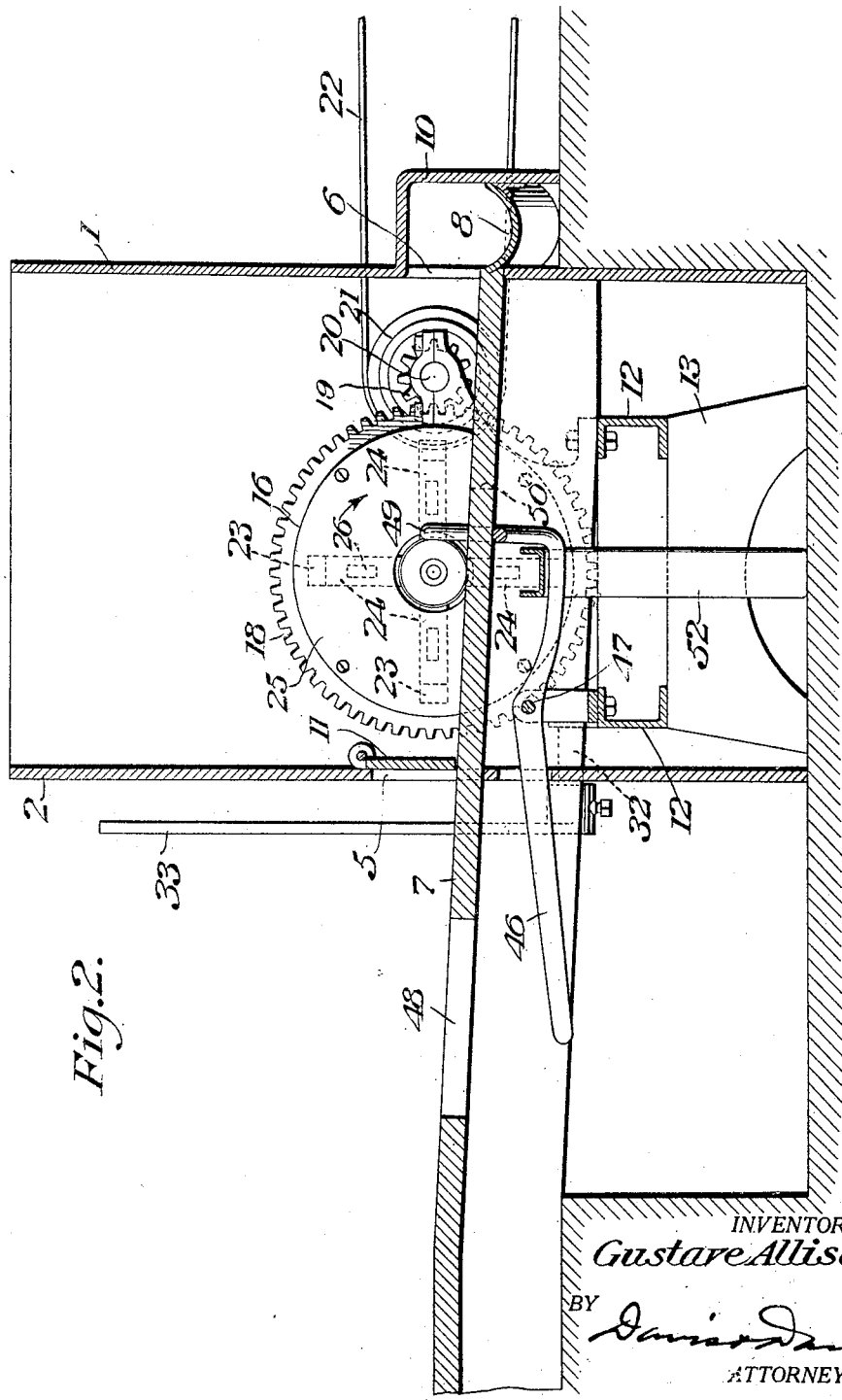

Sept. 16, 1924.   1,508,494
G. ALLISON
MACHINE FOR REMOVING THE BOOSTER CHARGE FROM A HIGH EXPLOSIVE SHELL
Filed Oct. 5, 1923   3 Sheets-Sheet 3
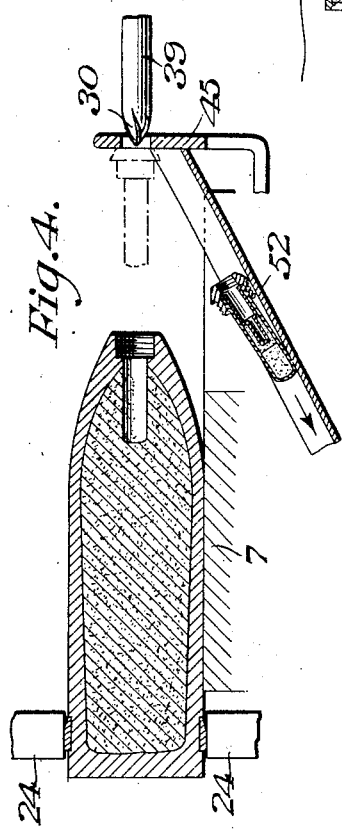
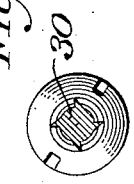
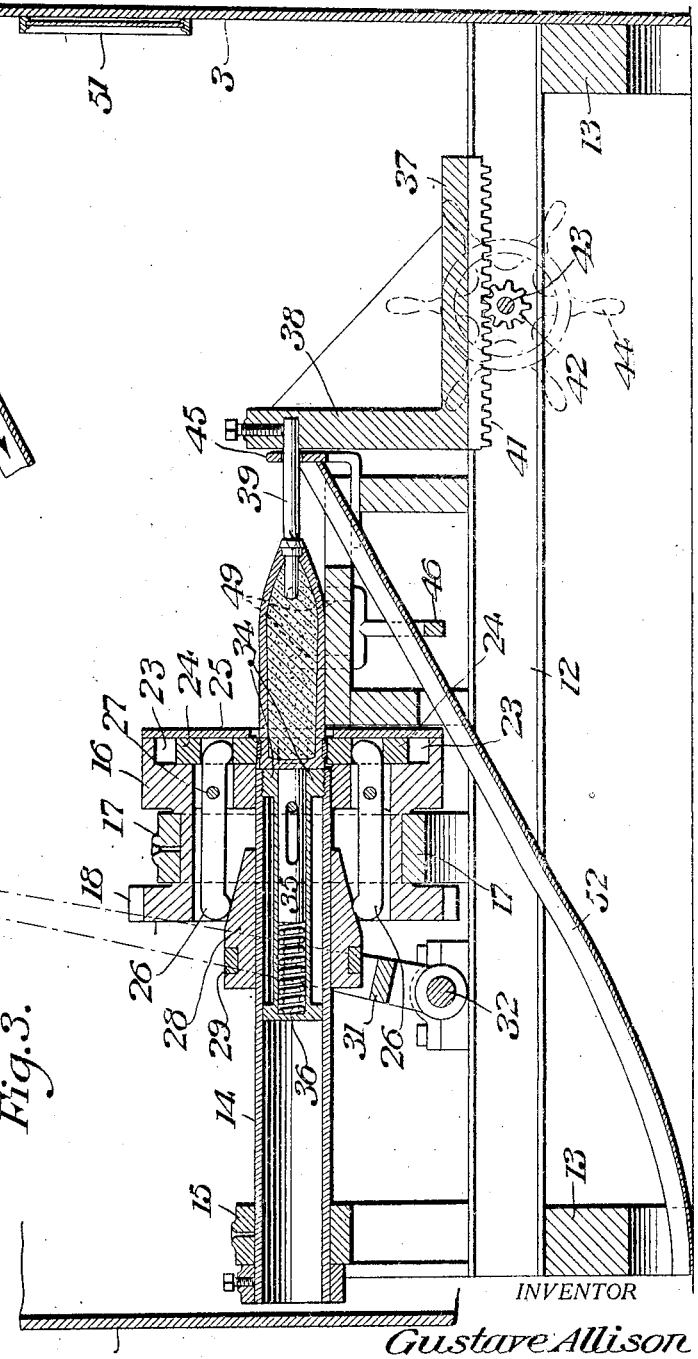
INVENTOR
Gustave Allison
BY
ATTORNEYS Patented Sept. 16, 1924.

1,508,494

UNITED STATES PATENT OFFICE.

GUSTAVE ALLISON, OF PERTH AMBOY, NEW JERSEY, ASSIGNOR TO COLUMBIA SALVAGE CORPORATION, OF NEW YORK, N. Y., A CORPORATION OF NEW YORK.

MACHINE FOR REMOVING THE BOOSTER CHARGE FROM A HIGH-EXPLOSIVE SHELL.

Application filed October 5, 1923. Serial No. 666,756.

*To all whom it may concern:*

Be it known that I, GUSTAVE ALLISON, a citizen of the United States, and resident of Perth Amboy, in the county of Middlesex and State of New Jersey, have invented certain new and useful Improvements in Machines for Removing the Booster Charge from a High-Explosive Shell (Case No. 7), of which the following is a specification.

A high explosive shell for artillery use consists ordinarily of a hollow steel shell filled with a charge of high explosive. The shell is usually pointed at one end and said pointed end is known as the nose. In the nose is formed a longitudinally extending threaded aperture in which is screwed a flanged adapter ring, said ring carrying a small cylindrical casing which extends into the shell and contains the so called booster charge. The fuse or fuse stock is screwed into the adapter ring and this also carries a small explosive charge. The fuse is not attached to the adapter ring until the shell is to be fired. The adapter ring and booster casing are secured to the shell in order to complete the loading thereof and to close the threaded aperture in the nose. This adapter ring and booster casing must be detached from the shell before the high explosive charge can be removed.

The object of this invention is to provide a machine for quickly and safely removing the booster charge from the shell.

There are other objects and advantages of the invention which will appear hereinafter.

In the drawings, Fig. 1 is a plan view of a machine embodying the invention;

Fig. 2 a transverse vertical sectional view taken on the line 2—2 of Fig. 1;

Fig. 3 a longitudinal vertical sectional view taken on line 3—3 of Fig. 1.

Fig. 4 a detail vertical sectional view illustrating the operation of removing and discharging the booster casing;

Fig. 5 a detail end view of the booster casing the removing tool being shown in cross section, and Fig. 6 a detail cross sectional view taken on the line 6—6 of Fig. 1.

Referring to the various parts by numerals, 1 designates a strong sheet shell casing which is open at its upper end, its lower end extending into a suitable pit or depression. This casing is substantially rectangular in plane view and the front wall 2 thereof terminates short of the right hand end wall 3 to form a vertical opening 4. This opening is comparatively narrow and is at the extreme right hand end of the front wall 2 of the casing. The casing is provided with an inlet opening 5 in its front wall and with an outlet opening 6 in its rear wall. Extending into the casing through the inlet 5 is a downwardly inclined table 7, said table extending entirely through the casing and terminating at the discharge opening 6. The shells to be operated upon are placed transversely of the table and permitted to roll down it through inlet 5 to the operating mechanism and after being operated upon they are released from the operating mechanism and permitted to continue their way down the table and to pass out through the discharge opening 6. From the discharge end of the table the shells drop into a downwardly inclined chute 8 from which they are delivered to the platform 9 outside of the casing 1. The discharge opening 6 is enclosed by a strong steel casing 10. The inlet 5 is normally closed by gravity door 11 which is pivoted along its upper edge and is mounted within the casing. This door swings freely inwardly to permit the shells to roll into the casing, and after the passage of a shell it automatically swings to closed position.

Within the casing are two horizontal parallel supports 12. These supports are arranged a suitable distance apart and are mounted on rigid base pieces 13 and constitute the main supporting frame of the machine. Extending longitudinally of the main frame, at the left hand end thereof, as shown in the drawings, is a horizontal tubular shaft 14. One end of the shaft is mounted in a bearing 15 supported on the main frame. The other end of this shaft carries a chuck 16, said chuck being rigidly connected to the shaft to rotate therewith. The chuck is reduced in diameter midway its ends to form a bearing portion which is adapted to rotate in the bearing 17 connected to the main frame. Rigidly connected to the outer end of the chuck is a large gear 18 which meshes with a smaller gear 19 carried by a shaft 20 and by means of which the chuck is rotated. The shaft 20 is provided with a pulley 21 over which a driving belt 22 runs.

The face of the chuck is formed with four radial grooves 23 in which are mounted gripping blocks 24, the inner ends of said gripping blocks being adapted to project into a central circular recess in the face of the chuck. These gripping blocks are held in place by a circular face plate 25 rigidly secured to the face of the chuck, said face plate being formed with a central circular aperture corresponding to the circular recess in the face of the chuck. The outer portion of the chuck is tubular and arranged in said tubular portion are four horizontal clutch levers 26. These clutch levers extend through apertures in the chuck and are mounted on pivots 27 secured in the chuck body. The forward or inner ends of these levers fit and operate in apertures formed in the gripping blocks 24. Slidably mounted on the shaft 14 is a cone shape wedge block 28, said block carrying a ring 29 recessed therein and connected by horizontal pivots 30 to the ends of a yoke 31. The yoke 31 extends upwardly from a rock shaft 32 mounted in suitable bearings on the main frame. One end of the shaft 32 extends through the forward wall 2 of the casing and is provided with an operating lever 33 outside of the casing so that the gripping dogs may be moved by an operator standing outside the casing 1. It is manifest that by swinging the lever 33 toward the right, as viewed in the drawings, the wedge block 28 will be forced into the chuck thereby throwing outwardly the outer ends of the clutch levers 26. This will result in an inward movement of all of the gripping blocks. By moving the lever 33 toward the left, as viewed in the drawings, the wedge block will be withdrawn from the chuck and the gripping blocks will be released. Rigidly mounted within the inner end of the shaft 14 is a tubular stop 34. Mounted within this tubular stop is a central horizontal plunger 34 which is normally projected forward and into the central circular recess of the chuck by a spring 36. Plunger 35 projects beyond the stop 34 and normally is in the vertical plane, or substantially so, of the face plate 25 of the chuck. The plunger is connected to its tubular guide by means of a pin and slot arrangement so that the forward or outward movement of the plunger is limited.

Mounted on the supports 12 of the main frame, near the right hand end of the casing, is a tool carrying slide 37 having an inner upright head portion 38 to which is rigidly secured a removing tool 39. This removing tool is tapered at its operating end and said tapered end is provided with sharp cutting spiral ridges 39'. The removing tool is horizontally arranged axially aligned with the axis of the chuck for the purpose which will hereinafter appear. The tool carrying slide is guided and held to the supports 12 by suitable guides 40; and is also provided with a longitudinally extending tooth rack 41. This rack is engaged by a pinion 42 carried by a horizontal transversely extending shaft 43. One end of the shaft 43 extends through the front wall 2 of the casing and is provided with an operating wheel 42. It is manifest that the tool carrying slide may be manipulated by an operator standing outside of the casing, and by means of a wheel 44 may be advanced toward the chuck or withdrawn therefrom. The removing tool 39 is adapted to pass through an aperture in a rigidly mounted stripping device 45 mounted on one of the supports of the table 7.

A shell arresting lever 46 is pivotally mounted at 47 below the table 7 and extends longitudinally thereof. One end of this lever extends through an aperture in the front wall of the casing and is radially accessible through a slot 48 in the table 7 so that said lever may be manipulated by an operator standing outside of the casing in front of the forward wall 2 thereof. The inner end of the shell arresting lever is formed with two upwardly extending stop fingers 49. These fingers extend upwardly through slots 50 in the table and are so positioned that they will hold a shell on the table centered with respect to the chuck, as shown clearly in Figs. 1 and 2 of the drawings. After the shell has been operated upon the lever 46 is manipulated to withdraw the stop fingers and thereby permit the shell to roll down the table 7 to the shute 8.

The front wall 2 of the casing is unbroken except for the aperture 4 at the right hand end thereof so that the said wall serves as a shield or guard for the operator. It is desired, however, that the operators see the operation of the machine on the shells. For this purpose a mirror 51 is mounted on the right hand end wall of the casing at the opening 4, said mirror facing toward the chuck. This enables the operators to observe in the mirror the operation of the machine on the shells while at the same time they are protected by the wall 2 from any injury through the possible explosion of a shell within the casing.

The operation of the machine is as follows:

A shell is permitted to run down the table 7 through the inlet 5 to the stop fingers 49 with the base of the shell toward the chuck and the nose of the shell carrying the booster casing pointed toward the removing tool. The operator then manipulates the wheel 44 to move the slide 37 inwardly and brings the removing tool into engagement with the booster casing in the nose of the shell. A continued forward movement of the slide moves the shell transversely of the table and brings the base of the shell into engagement with the plunger 35. The plunger will be forced inwardly and the shell will be arrested when the base thereof engages the fixed stop 34. The base of the shell is now in position to be engaged by the gripping blocks 24. The operator then moves the lever 33 toward the right causing the wedge block 28 to engage the lever 26 and thereby throw the gripping blocks 24 into engagement with the shell. This operation locks the shell to the chuck and the shell will be rotated in the direction indicated by the arrows in Figs. 1 and 2. The removing tool will be held pressed firmly against the end of the booster casing so that the rotation of the shell will cause the tool to bite into the booster casing unscrewing it from the nose of the shell. The operator, by means of the mirror, will note the operation of the machine and as the booster casing is unscrewed from the shell he will ease up the tool carrying slide so that the booster casing will be unthreaded from the shell. The removing tool will bite into the booster casing to such an extent that the booster casing will be attached to the removing tool so that when it is entirely unthreaded from the shell an outward movement of the tool will carry the booster casing with it. The purpose of the stripping device 45 is to strip the booster casing from the removing tool and permit it to drop into the discharge chute 52. The chute 52 leads to any suitable point outside of the casing 1. After the withdrawal of the removing tool the lever 33 is thrown to the left to release the gripping blocks 24. When the gripping blocks are released the plunger 35 forces the shell out of the chuck, and then by manipulating the lever 46 the shell may be permitted to roll down the table to chute 8 by which it will be discharged to the platform 9 outside of the casing 1. It will of course be understood that the table 7 is so arranged that when a shell is arrested by the stop finger 49 the said shell will be approximately centered with respect to the chuck. When the shell is gripped in the chuck it will be centered and axially aligned with the removing tool.

What I claim is:

1. The combination of a casing, a rotatable chuck therein, means for delivering shells to said chuck within the casing, a removing tool within the casing, means for bringing said removing tool into engagement with the booster casing in the end of the shell to thereby force the shell into the chuck, and means for rigidly gripping the shell in the chuck.

2. The combination of a casing, a rotatable chuck therein, means for delivering shells to said chuck within the casing, a non-rotatable removing tool within the casing, means for bringing said removing tool into engagement with the booster casing in the end of the shell to thereby force the shell into the chuck, and means for rigidly gripping the shell in the chuck.

3. The combination of a casing provided with an inlet, means for delivering shells within said casing through said inlet, a rotatable chuck within the casing, means for holding a shell with its axis approximately coincident with the axis of the chuck, a non-rotatable removing tool, means for supporting said tool in line with the axis of the chuck, means for bringing said removing tool into engagement with the booster casing in the end of the shell to thereby force the shell into the chuck, and means for rigidly gripping the shell in the chuck.

4. The combination of a casing provided with an inlet, means for delivering shells within said casing through said inlet, a rotatable chuck within the casing, means for holding a shell with its axis approximately coincident with the axis of the chuck, a non-rotatable removing tool, means for supporting said tool in line with the axis of the chuck, means for bringing said removing tool into engagement with the booster casing in the end of the shell to thereby force the shell into the chuck, means for rigidly gripping the shell in the chuck, and means for ejecting the shell from the chuck when the shell gripping means is released.

5. The combination of a casing provided with an inlet, means for delivering shells within said casing through said inlet, a rotatable chuck within the casing, means for holding a shell with its axis approximately coincident with the axis of the chuck, a non-rotatable removing tool formed with a threaded tapered end, means for supporting said tool in line with the axis of the chuck, means for bringing the said tapered end of said removing tool into engagement with the booster casing in the end of the shell to thereby force the shell into the chuck, means for rigidly gripping the shell in the chuck, and means for ejecting the shell from the chuck when the shell gripping means is released.

6. The combination of a casing provided with an inlet, means for delivering shells within said casing through said inlet, a rotatable chuck within the casing, means for holding a shell with its axis approximately coincident with the axis of the chuck, a non-rotatable removing tool formed with a threaded tapered end, means for supporting said tool in line with the axis of the chuck, means for bringing the said tapered end of said removing tool into engagement with the booster casing in the end of the shell to thereby force the shell into the chuck, means for rigidly gripping the shell in the chuck, means for ejecting the shell from the chuck when the shell gripping means is released, and a stripping device to detach the booster casing from the removing tool.

7. The combination of a casing, a rotatable chuck therein, means for delivering a shell to said chuck within the casing, a non-rotatable removing tool within the casing, means operable outside of the casing for bringing said removing tool into engagement with the booster casing in the end of the shell to thereby force the shell into the chuck, and means operable from the outside of the casing for rigidly gripping the shell in the chuck.

8. The combination of a casing, a rotatable chuck therein, means for delivering a shell to said chuck within the casing, a non-rotatable removing tool within the casing, means operable outside of the casing for bringing said removing tool into engagement with the booster casing in the end of the shell to thereby force the shell into the chuck, means operable from the outside of the casing for rigidly gripping the shell in the chuck, and a mirror observable from without the casing and reflecting the operation of the mechanism within the casing.

9. The combination of a casing provided with an inlet, means for delivering shells within said casing through said inlet, a rotatable chuck within the casing, movable means for holding a shell with its axis approximately coincident with the axis of the chuck, operating means connected to said holding means and extending outside of the casing, a non-rotatable removing tool formed with a threaded tapered end, means for supporting said tool in line with the axis of the chuck, means for bringing the tapered end of said removing tool into engagement with the booster casing in the end of the shell to thereby force the shell into the chuck, means operable outside of the casing for moving the said removing tool, means for rigidly gripping the shell in the chuck, and means operable outside of the casing for actuating the shell gripping means.

10. The combination of a casing provided with an inlet, means for delivering shells within said casing through said inlet, a rotatable chuck within the casing, movable means for holding a shell with its axis approximately coincident with the axis of the chuck, operating means connected to said holding means and extending outside of the casing, a non-rotatable removing tool formed with a threaded tapered end, means for supporting said tool in line with the axis of the chuck, means for bringing the tapered end of said removing tool into engagement with the booster casing in the end of the shell to thereby force the shell into the chuck, means operable outside of the casing for moving the said removing tool, means for rigidly gripping the shell in the chuck, means operable outside of the casing for actuating the shell gripping means, and a mirror observable from without the casing and reflecting the operation of the mechanism within the casing.

11. The combination of a casing, a rotatable chuck therein, means for delivering a shell to said chuck within the casing, a removing tool within the casing, means for bringing said removing tool into engagement with the booster casing in the end of the shell, and means for rigidly gripping the shell in the chuck.

12. The combination of a casing provided with an inlet, means for delivering shells within said casing through said inlet, a rotatable chuck within the casing, means for holding a shell with its axis approximately coincident with the axis of the chuck, a non-rotatable removing tool, means for supporting said tool in line with the axis of the chuck, means for bringing said removing tool into engagement with the booster casing in the end of the shell, means for rigidly gripping the shell in the chuck, and means for ejecting the shell from the chuck when the shell gripping means is released.

13. The combination of a casing provided with an inlet and a discharge opening in opposite sides of the casing, an inclined conveyor table extending through the inlet and the casing to the discharge opening, a rotatable chuck within the casing, movable means for holding a shell on the said table with its axis approximately coincident with the axis of the chuck, operating means connected to said holding means and extending outside of the casing, a non-rotatable removing tool formed with a threaded tapered end, means for supporting said tool in line with the axis of the chuck, means for bringing the tapered end of the said removing tool into engagement with the booster casing in the end of the shell, means operable outside of the casing for moving the said tool, means for rigidly gripping the shell in the chuck, means operable outside of the casing for actuating the shell gripping means, and means for ejecting the shell from the chuck when the shell gripping means is released.

14. The combination of a rotatable chuck, means for holding a shell with its axis approximately coincident with the axis of the chuck, a non-rotatable removing tool formed with a threaded tapered end, means for supporting said tool in line with the axis of the chuck, means for bringing the tapered end of said removing tool into engagement with the booster casing in the end of the shell to thereby force the shell into the chuck, means for rigidly gripping the shell in the chuck, and means for ejecting the shell from the chuck when the shell gripping means is released.

15. The combination of an inclined conveyor table, a rotatable chuck at one side of the table with its axis transverse of the table, movable means for holding a shell on said table with its axis transverse of the table and approximately coincident with the axis of the chuck, means for operating said holding means to release the shell, a non-rotatable removing tool formed with a threaded tapered end, means for supporting said tool in line with the axis of the chuck, means for bringing the tapered end of the said tool into engagement with the booster casing in the end of the shell to thereby force the shell into the chuck, means for rigidly gripping the shell in the chuck, and means for ejecting the shell from the chuck when the shell gripping means is released.

In testimony whereof I hereunto affix my signature.

GUSTAVE ALLISON.